US008833063B2

(12) United States Patent
Snopko et al.

(10) Patent No.: US 8,833,063 B2
(45) Date of Patent: Sep. 16, 2014

(54) METHODS AND SYSTEM FOR ASH DETECTION IN EXHAUST PARTICULATE FILTER (75) Inventors: Michael A. Snopko, Washington, IL (US); Rajesh N. Nair, Mossville, IL (US); Anthony C. Rodman, Langtoft (GB)

(73) Assignee: Caterpillar Inc., Peoria, IL (US)

( * ) Notice: Subject to any disclaimer, the term of this patent is extended or adjusted under 35 U.S.C. 154(b) by 373 days.

(21) Appl. No.: 13/109,550

(22) Filed: May 17, 2011

(65) Prior Publication Data
US 2012/0291419 A1 Nov. 22, 2012

(51) Int. Cl.
*F01N 3/00* (2006.01)
*F01N 9/00* (2006.01)
*F01N 11/00* (2006.01)

(52) U.S. Cl.
CPC ............... *F01N 11/00* (2013.01); *Y02T 10/47* (2013.01); *F01N 2900/1611* (2013.01); *F01N 2560/12* (2013.01); *F01N 9/002* (2013.01); *F01N 9/007* (2013.01); *F01N 2550/04* (2013.01); *Y10S 55/01* (2013.01); *Y10S 55/30* (2013.01)
USPC ............... 60/297; 60/274; 60/275; 60/295; 55/DIG. 1; 55/DIG. 30

(58) Field of Classification Search
USPC ......... 60/274, 275, 295, 297, 311; 55/DIG. 1, 55/DIG. 6, DIG. 30
See application file for complete search history.

(56) References Cited

U.S. PATENT DOCUMENTS

| | | | |
|---|---|---|---|
| 4,477,771 A | 10/1984 | Nagy et al. | |
| 5,157,340 A | 10/1992 | Walton et al. | |
| 5,177,444 A | 1/1993 | Cutmore | |
| 5,423,180 A * | 6/1995 | Nobue et al. | 60/274 |
| 5,497,099 A | 3/1996 | Walton | |
| 6,240,722 B1 | 6/2001 | Busch et al. | |
| 7,157,919 B1 | 1/2007 | Walton | |
| 7,253,641 B2 * | 8/2007 | Knitt et al. | 324/639 |
| 7,260,930 B2 | 8/2007 | Decou et al. | |
| 7,931,727 B2 * | 4/2011 | Gonze et al. | 55/523 |
| 8,384,396 B2 * | 2/2013 | Bromberg et al. | 324/636 |
| 8,384,397 B2 * | 2/2013 | Bromberg et al. | 324/636 |
| 2008/0018442 A1 | 1/2008 | Knitt | |
| 2008/0048681 A1 | 2/2008 | Birkhofer et al. | |
| 2008/0059093 A1 | 3/2008 | Bromberg et al. | |

(Continued)

FOREIGN PATENT DOCUMENTS

| | | |
|---|---|---|
| JP | 04301125 | 10/1992 |
| WO | 2009/031600 | 3/2009 |

*Primary Examiner* — Binh Q Tran
(74) *Attorney, Agent, or Firm* — Liell & McNeil (57) ABSTRACT A method of detecting ash in an exhaust particulate filter system for an internal combustion engine includes transmitting electromagnetic energy through an exhaust particulate filter containing soot and ash, and sensing a strength of the transmitted electromagnetic energy after having been attenuated in response to the soot. The method further includes electronically storing a filter monitoring history responsive to a difference between the transmitted strength and the sensed strength of the electromagnetic energy, and detecting an amount of the ash based at least in part upon a pattern of electromagnetic energy attenuation defined by the stored filter monitoring history. An exhaust particulate filter system for implementing related methodology includes a microprocessor configured to determine a value indicative of an amount of ash contained within an exhaust particulate filter responsive to a pattern of electromagnetic energy attenuation defined by a stored filter monitoring history.

15 Claims, 4 Drawing Sheets

(56) References Cited

U.S. PATENT DOCUMENTS

| | | |
|---|---|---|
| 2010/0101409 A1 | 4/2010 | Bromberg et al. |
| 2010/0102828 A1 | 4/2010 | Bromberg et al. |
| 2010/0180577 A1 | 7/2010 | Gonze |
| 2010/0187089 A1 | 7/2010 | Daido et al. |
| 2010/0242442 A1 | 9/2010 | Kondo et al. |

* cited by examiner

METHODS AND SYSTEM FOR ASH DETECTION IN EXHAUST PARTICULATE FILTER

TECHNICAL FIELD

The present disclosure relates generally to detection of ash in an exhaust particulate filter system, and relates more particularly to detecting ash responsive to a pattern of electromagnetic energy attenuation defined by a stored filter monitoring history.

BACKGROUND

Diesel particulate filters are used in many diesel engine systems to trap particulates generated during the combustion of hydrocarbon fuels such as conventional diesel fuel, biodiesel, and various blends. These particulates can include a variety of organic and inorganic species, with soot and ash being of particular interest. A typical design employs a filter medium such as a ceramic or metallic medium positioned within a filter body and adapted to trap particulates carried in the exhaust stream between an inlet and an outlet of the filter.

Diesel particulate filters are often classified based on whether they "actively" or "passively" regenerate in response to soot accumulation. Regeneration generally involves inducing combustion of soot accumulated in the filter medium. In active regeneration, some external mechanism such as the introduction of a combustible fuel into the exhaust gas stream is used to raise a temperature within the filter to a point sufficient to induce combustion of the soot. In passive systems, catalysts are often used to promote combustion of accumulated soot under more ordinary filter operating temperatures. In either case, regeneration of the filter tends to do little, if anything, to remove accumulated ash. Since ash tends to accumulate much more slowly than soot, diesel particulate filters are typically cleaned of ash when the diesel particulate filter is removed from service for maintenance or other purposes.

Cleaning ash from a diesel particulate filter tends to be a relatively labor intensive process. While certain strategies have been proposed for actually monitoring accumulation of ash, they are not without shortcomings. As a result, maintenance technicians may find that filters removed from an engine for ash removal may be overloaded or under-loaded. Either case is undesirable, as an under-loaded filter may not need to have been removed, and an overloaded filter may be negatively affecting performance. The use of alternative fuels can exacerbate imperfections in conventional ash monitoring or modeling strategies. For example, bio-diesel fuels and blends tend to generate a relatively greater amount of ash then conventional diesel fuels. A viable ash sensing strategy has thus long been sought.

U.S. Pat. No. 7,157,919 to Walton discloses a method and system for detecting soot and ash concentrations in a filter. Walton proposes measuring ash build-up within a diesel particulate filter via the use of RF signals transmitted through the filter after filter regeneration. Walton indicates that after soot has been oxidized and a clean filter remains hot following regeneration, the higher temperatures can increase an "ash loss factor." Consequently, discriminating between a hot, clean filter and a filter loaded with ash appears possible, at least in the context of Walton's technique.

SUMMARY OF THE DISCLOSURE

In one aspect, a method of detecting ash in an exhaust particulate filter system for an internal combustion engine includes sensing a strength of electromagnetic energy transmitted through an exhaust particulate filter containing soot and ash. The method further includes updating an electronically stored filter monitoring history responsive to a difference between a transmitted strength of the electromagnetic energy and the sensed strength. The method further includes determining a value indicative of an amount of the ash responsive to a pattern of electromagnetic energy attenuation defined by the updated filter monitoring history.

In another aspect, an exhaust particulate filter system for an internal combustion engine includes an exhaust particulate filter having a filter medium positioned fluidly between an exhaust inlet and an exhaust outlet in a filter housing, and being configured to trap soot and ash in exhaust from an internal combustion engine. The system further includes a monitoring system having a transmitter for transmitting electromagnetic energy through the exhaust particulate filter, and a receiver for sensing a strength of the transmitted electromagnetic energy. The monitoring system further includes a computer readable memory configured to store a filter monitoring history which includes data indicative of a difference between transmitted strength of the electromagnetic energy and sensed strength. The monitoring system further includes a microprocessor coupled with the computer readable memory and being configured to determine a value indicative of an amount of ash contained within the exhaust particulate filter responsive to a pattern of electromagnetic energy attenuation defined by the stored filter monitoring history.

In still another aspect, a method of operating an exhaust particulate filter system includes transmitting electromagnetic energy through an exhaust particulate filter containing soot and ash, and sensing a strength of the transmitted electromagnetic energy after having been attenuated in response to the soot. The method further includes electronically storing data indicative of a difference between the transmitted strength and the sensed strength on a computer readable memory, such that a filter monitoring history stored on the computer readable memory defines a pattern of electromagnetic energy attenuation over time. The method further includes detecting an amount of the ash contained within the exhaust particulate filter responsive to the pattern.

DETAILED DESCRIPTION

Figure 1:
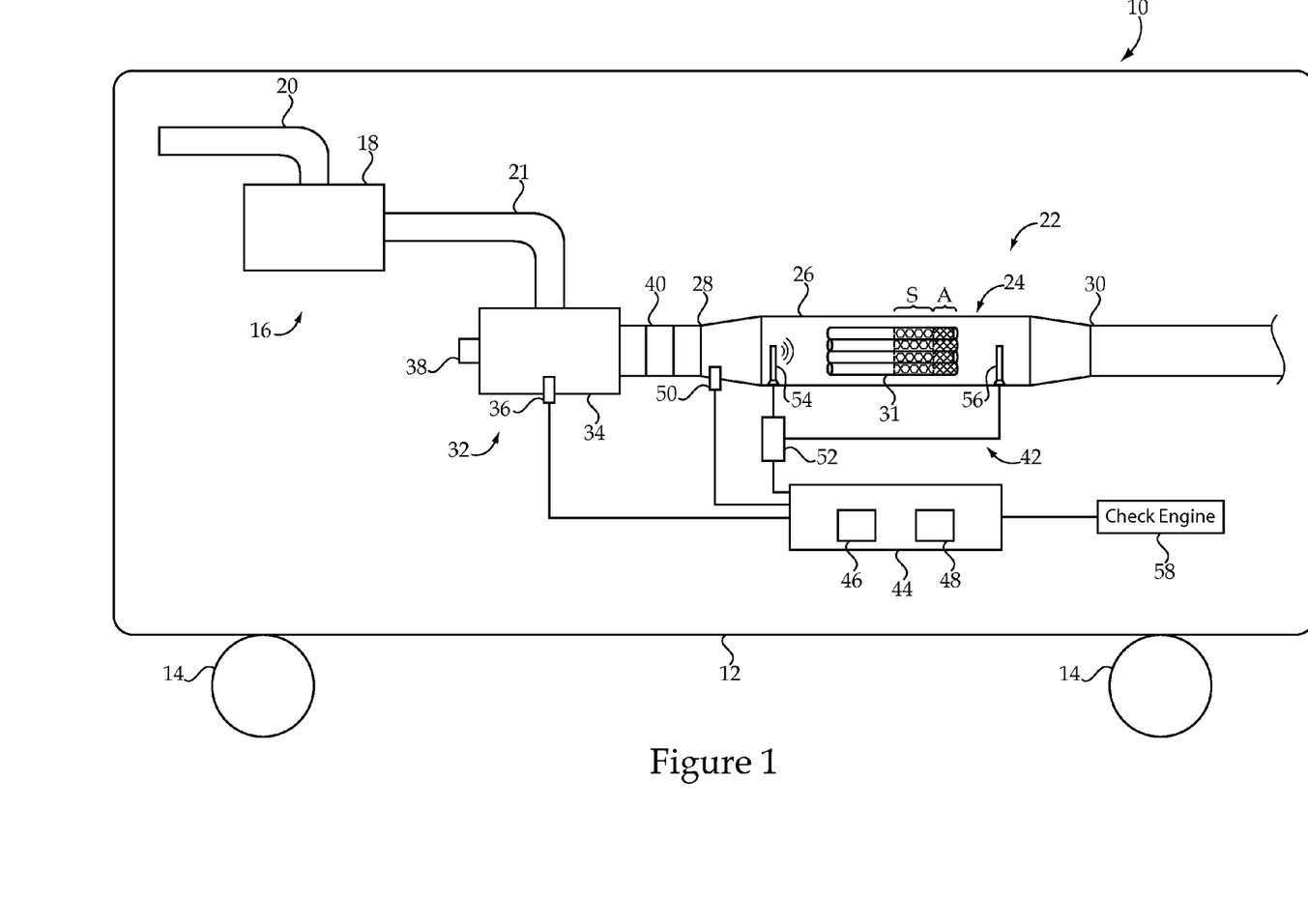
FIG. 1 is a diagrammatic view of a machine having an exhaust particulate filter system, according to one embodiment.

Referring to FIG. 1, there is shown a machine 10 according to one embodiment. Machine 10 may include a mobile machine such as an on-highway or off-highway truck having a frame 12 and a set of ground engaging propulsion elements 14 such as wheels or tracks coupled with frame 12. Machine 10 might also include a different mobile machine such as a motor grader, a compactor, a scraper, a tractor, or a passenger vehicle such as a bus or RV. In other embodiments, machine 10 might include a stationary machine such as a genset, a pump, a compressor, or any of a variety of other stationary machines. Machine 10 may further include an engine system 16 having an internal combustion engine 18 such as a compression ignition diesel engine 18 mounted to frame 12. Engine system 16 may further include an intake conduit 20 configured to convey intake air to engine 18 in a conventional manner, and an exhaust conduit 21 conveying combustion products from combustion of the intake air with a fuel, such as a distillate diesel fuel, to an exhaust particulate filter system 22. Particulate filter system 22 may include an exhaust particulate filter 24 having a filter medium 31 positioned fluidly between an exhaust inlet 28 and an exhaust outlet 30 in a filter housing 26. Exhaust particulate filter 24 is configured to trap soot and ash in the exhaust from engine 18 in a conventional manner. As further described herein, detection of an amount of ash contained within exhaust particulate filter 24 may take place by way of strategies unique to the present disclosure.

Filter system 22 may further include a regeneration mechanism 32 positioned upstream exhaust inlet 28 in one embodiment, and configured to initiate regeneration of filter 22 to combust accumulated particulates such as soot. In one embodiment, regeneration mechanism 32 may include an injection mechanism having an actuator 36 configured to inject or otherwise supply a fuel into a stream of exhaust gases entering filter 22. Combustion air may be supplied into the stream of exhaust gases by way of an air inlet 38 to a housing 34 of mechanism 32. In other embodiments, another regeneration mechanism such as an electric heater might be used, or a dosing system configured to inject fuel and a catalyst into the exhaust gases. Still other strategies might include back pressure increasing mechanisms, or engine operating strategies such as post injections which increase exhaust temperatures sufficiently to initiate combustion of soot trapped within filter 22. A diesel oxidation catalyst (DOC) 40 may be positioned fluidly between mechanism 32 and exhaust inlet 28. A selective catalytic reduction (SCR) module (not shown) might be positioned downstream filter 24 in certain embodiments.

Filter system 22 may further include a monitoring system 42 having a transmitter 54 for transmitting electromagnetic energy through filter 24, and a receiver 56 for sensing a strength of the transmitted electromagnetic energy after having been attenuated in response to soot contained within filter 24, e.g. soot trapped in filter medium 31. Monitoring system 42 may further include an electronic control unit 44 which includes a microprocessor 46 and a computer readable memory 48 coupled with microprocessor 46. Computer readable memory 48 may include any suitable type of memory such as RAM, ROM, flash memory or a hard drive, for instance, and may be configured to store a filter monitoring history for filter 24 which includes information that can be leveraged to detect an amount of ash contained within filter 24, as further described herein. Memory 48 may also store computer executable code comprising an ash detection routine, example methodology of which is also further described herein.

The stored filter monitoring history may include data indicative of a difference between transmitted strength of the electromagnetic energy transmitted via transmitter 54 and sensed strength of the electromagnetic energy sensed via receiver 56. Microprocessor 46 may be configured to determine a value indicative of an amount of ash contained within filter 24, responsive to a pattern of electromagnetic energy attenuation defined by the stored filter monitoring history. The pattern may include a pattern over time, and in particular a pattern of changed attenuation from an earlier time to a later time, as further described herein. An operator perceptible alert mechanism 58, such as a check engine light located in an operator cab of machine 10, may be coupled with electronic control unit 44. Mechanism 58 may be activated in response to detection of certain conditions of filter system 22, such as where a detected amount of ash is indicative of a change in relative ash loading state among a finite number of relative ash loading states of exhaust particulate filter 24.

A second electronic control unit 52, which may also include a microprocessor, is shown coupled with each of transmitter 54 and receiver 56, and also coupled with electronic control unit 44. In one practical implementation strategy, electronic control unit 52 may output signals to electronic control unit 44 encoding a difference between the transmitted strength of electromagnetic energy and the sensed strength of electromagnetic energy. The signals output via electronic control unit 52 may encode data in units such as decibels, for instance. Electronic control unit 52 may include a dedicated filter monitoring unit, whereas electronic control unit 44 may be configured to monitor and control other aspects of engine operation, such as timing of filter regeneration. All the data processing functions described herein could of course be executed by a single, appropriately programmed computer. Each of transmitter 54 and receiver 56 may include an antennae capable of either transmitting or receiving electromagnetic energy, as are known in the art. Thus, descriptions herein of "transmitter" or "receiver" are not used in any limiting sense, and the described roles of these components might be reversed or modified from the strategy disclosed.

The electromagnetic energy transmitted through filter 24 may include a series of discrete, sequential pulses transmitted via transmitter 54 and received via receiver 56. The pulses may thus be transmitted at a transmission strength, and sensed at a reduced strength after having been attenuated in response to trapped soot within filter medium 31. Each of the discrete pulses may include a different frequency such that a collection of frequencies, in one embodiment defining a continuous frequency band, are transmitted through filter medium 31 via transmitter 54 and received via receiver 56. One example protocol includes transmitting a one millisecond pulse at a first frequency, followed by a second one millisecond pulse at a different frequency, followed by a third one millisecond pulse at yet another frequency, and so on, until a frequency band of about 200 megahertz (MHz) has been transmitted and received. In one embodiment, the collection of transmitted frequencies may include frequencies in the radio frequency range of about 700 MHz to about 900 MHz. While 700 MHz to 900 MHz has been found to be a practical implementation strategy for detecting ash in an exhaust particulate filter, other frequency ranges may be suitable. Furthermore, it is not necessary to utilize a continuous frequency band. Using a collection of frequencies has nevertheless been discovered to be advantageous with respect to canceling out or otherwise minimizing the effect of resonance and/or null frequencies, or other potentially aberrant or confounding factors. The signals output via electronic control unit 52 to electronic control unit 44 may include signals encoding a mean value which is an average of the difference between transmitted strength and sensed strength of the electromagnetic energy for each of the collection of electromagnetic frequencies. Accordingly, electronic control unit 44 may store such mean values over time to establish the filter monitoring history. Each time electronic control unit 44 receives a signal from unit 52, or otherwise receives data relating to transmitted strength and sensed strength of the electromagnetic energy, unit 44 may update the stored filter monitoring history.

As mentioned above, microprocessor 46 may be configured to determine a value indicative of an amount of ash contained within filter 24 responsive to a pattern of electromagnetic energy attenuation defined by the stored filter monitoring history. Another way to understand this capability is that microprocessor 46 can calculate, infer, look up, or otherwise electronically determine a value which is directly or indirectly indicative of an amount of the ash contained within filter 24. The value may be determined based at least in part upon the monitoring history which results from transmitting and sensing electromagnetic energy as described herein, and storing data associated with the difference between transmitted and sensed strength. The determined value might include a calculated or estimated mass, say, "Z" kilograms of ash. The determined value might also include a calculated/estimated relative amount such as 10% maximum ash load, 20%, etc.

Those skilled in the art will appreciate that the principle of leveraging changes in electromagnetic energy attenuation as an exhaust particulate filter loads with particulates over time has been used in various forms to detect soot. The present disclosure likewise utilizes principles of changing attenuation of electromagnetic energy as an exhaust particulate filter loads with particulates over time, but reflects additional insights and discoveries relating to how electromagnetic energy interacts with soot under different ash loading conditions. As will be further apparent from the following description, the way in which soot interacts with electromagnetic energy when a filter is relatively lightly ash loaded can differ from the way soot interacts with electromagnetic energy when a filter is more heavily ash loaded.

Figure 2:
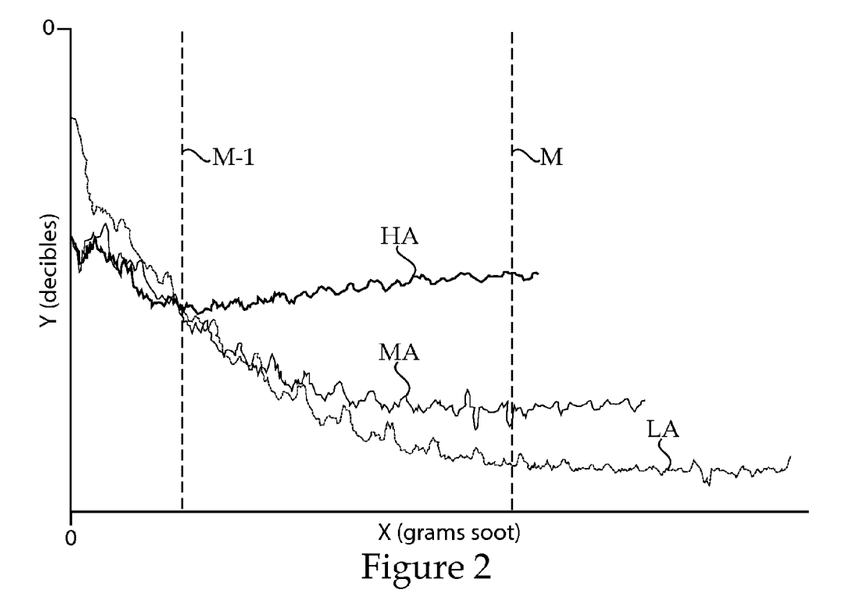
FIG. 2 is a graph illustrating attenuation of electromagnetic energy in comparison to soot amount in an exhaust particulate filter system at three different ash loading states.

Referring now to FIG. 2, there is shown a graph of mean attenuation of electromagnetic energy for a collection of frequencies with respect to a mass of trapped soot within an exhaust particulate filter such as filter 24. Three different signal traces are shown, including a first trace LA corresponding to a low ash condition of filter 24, a second trace MA corresponding to a medium ash condition, and a third trace HA corresponding to a high ash condition. Signal traces LA, MA, and HA may be understood as graphical representations of the stored filter monitoring history described herein. As will be apparent from the following description, patterns of attenuation defined by the stored filter monitoring history may be observed and exploited to detect ash. It may be noted that each of the signal traces has a different profile, illustrating a different response of the same collection of electromagnetic frequencies to particulates, namely soot, trapped in filter 24 under different relative amounts of trapped ash. In other words, LA, MA, and HA, might result from monitoring three different soot loading cycles of filter 22 at three different times, and where a relative amount of trapped ash is different at each of the three different times. Given the relatively slow rate of accumulation of ash as compared to the rate of accumulation of soot, the time periods during which data represented in traces LA, MA, and HA is obtained may be separated by hundreds of hours of engine operation. Signal trace LA represents an example 0% ash loading state, MA represents an example 50% ash loading state, and HA represents an example 100% ash loading state, as might be obtained via executing the example protocol described herein in which sequential pulses of electromagnetic energy are transmitted from about 700 MHz to about 900 MHz, each of about one millisecond, and then the cycle repeated, continuously during three soot loading cycles of filter 24. It should be appreciated that a 50% ash loading state, for instance, does not necessarily mean that 50% of the volume of filter 24 is filled with ash, but instead that filter 24 has trapped about one half of an intended ash loading capacity.

It may also be noted that signal trace HA has an inflection point, or minimum value, approximately at a soot mass M-1, while signal trace MA has an inflection point, or minimum value, approximately at a soot mass M. Signal trace LA does not appear to reach an inflection point/minimum value in FIG. 2, but could nevertheless be expected to do so if measurements were continued with increasing soot mass beyond what is shown in FIG. 2, although it might not be desirable to subject filter 24 to such conditions for reasons which will be readily apparent to those skilled in the art. The inflection points/minimum values of the respective signal traces may occur at saturation conditions beyond which electromagnetic energy may cease to show any greater attenuation in response to an increasing amount of trapped soot. This general phenomenon is believed to be the result of newly accumulating soot "shielding" already trapped soot from the transmitted electromagnetic energy such that the electromagnetic energy "sees" the same or even a reduced amount of soot with increased soot accumulation. In at least certain instances, when additional soot is deposited beyond saturation conditions, attenuation of electromagnetic energy may actually appear to decrease as more and more soot is deposited.

It may also be noted that saturation of the differently profiled signal traces occurs at different masses of trapped soot. This is believed to be due to soot packing to a relatively denser soot cake relatively more quickly under higher ash loading conditions than lower ash loading conditions. In FIG. 1, a zone A of filter medium 31 represents a portion of filter medium 31 presently containing ash. A second zone S is adjacent zone A and represents a portion of filter medium 31 presently containing trapped soot. As ash accumulates over time, the relative size of zone A can be expected to increase, leaving less available filter volume to contain trapped soot. Accordingly, it may be appreciated that due to trapped ash occupying space within filter 24, soot has available a decreasing amount of filter volume to occupy as ash volume increases. Due to the above mentioned phenomenon of additional accumulation of soot shielding already deposited soot, with less available filter volume due to an increasing amount of trapped ash, the shielding effect may be observed relatively sooner for a filter containing a relatively large amount of trapped ash than would be expected for a filter containing a relatively small amount of trapped ash. It may thus be appreciated that a pattern of attenuation of electromagnetic energy over time in response to an increasing amount of trapped soot within an exhaust particulate filter can be expected to be based at least in part upon an amount of trapped ash, as illustrated by way of the different signal traces in FIG. 2. Detecting an inflection point or other features indicative of a saturation pattern or an expected saturation pattern may be used to determine that the associated filter has a particular amount of ash contained therein. In one embodiment, an amount of soot at which saturation is detected might be mapped to ash amount, and possibly also mapped to other factors such as temperature as further discussed herein. Any suitable known or to be discovered soot detection strategy might be used. For instance, by monitoring electromagnetic energy attenuation over time and detecting saturation at a soot mass of "X" grams, it may be concluded that the associated filter is at a 50% ash loading state. Similarly, detection of saturation at M-1 soot grams could indicate that the filter is at or close to a 100% ash loading state. Detection of inflection points might also be used, in a similar manner. Relationships among these factors can be readily determined empirically, for instance by way of recording a filter monitoring history as described herein, and periodically examining ash amounts of the filter such as by weighing, then populating a map with a soot mass coordinate and an ash amount coordinate, as well as a temperature coordinate as further described herein. Still other techniques such as curve fitting might be used to determine when a particular pattern of attenuation corresponds to a particular amount of ash.

In other embodiments, the slope of a line defined by a pattern of electromagnetic energy attenuation might be used to detect ash. It may be noted that each of signal traces LA, MA, and HA, is relatively irregular in FIG. 2. While some signal trace irregularity, if only noise, might be expected in virtually any soot detection strategy, the roughly periodic rises and falls in each of signal traces LA, MA, and HA result at least in part from changes in filter temperature. At relatively higher temperatures attenuation of electromagnetic energy in response to trapped soot may be greater than attenuation at relatively lower temperatures, thus as exhaust temperature changes in response to engine cycle conditions, the attenuation of electromagnetic energy can be expected also to change. Gathering sufficient data may nevertheless be expected to enable one to determine a slope of a line defined by the stored filter monitoring history such that ash may be detected via a relationship among slope, soot amount, and ash amount. For instance, a slope of "Z" in a soot amount range from "P" to "Q" may be correlated with an ash amount of, say, 75% of total allowable ash.

Figure 3:
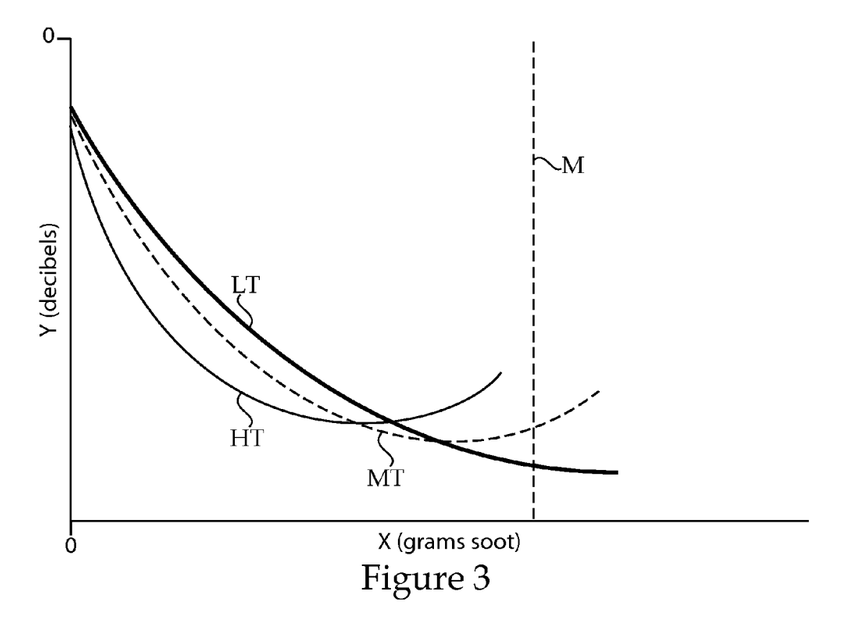
FIG. 3 is a graph illustrating attenuation of electromagnetic energy in comparison to soot amount in an exhaust particulate filter system at three different temperature conditions.

Referring now to FIG. 3, there is shown a graph of attenuation of electromagnetic energy in comparison to soot amount, including three normalized signal traces LT, MT and HT. As noted above, temperature may be a factor influencing a pattern of attenuation of electromagnetic energy as an exhaust particulate filter loads with soot over time. In implementing the teachings set forth herein to detect an amount of ash trapped within exhaust particulate filter, consideration of temperature may increase accuracy and precision. In general terms, at a relatively higher filter temperature, a pattern of attenuation may shift such that saturation occurs at a relatively lesser soot amount, and reaching saturation via a relatively steeper increase in attenuation. Conversely, at relatively lower filter temperatures, the pattern of attenuation may shift in the opposite direction such that saturation occurs at a relatively greater amount of soot, and by way of a less steep pattern of increasing attenuation. Thus, in FIG. 3 signal trace HT corresponds to a higher filter temperature, signal trace MT corresponds to a medium filter temperature, and signal trace LT corresponds to a lower filter temperature. Signal trace LT represents approximately a normalized curve based on the raw data illustrated via signal trace LA in FIG. 2. In FIG. 3, the respective signal traces are normalized by way of smoothing out the fluctuations that occur in response to temperature cycling of the engine, and instead represents the curves as they might appear where filter temperature is averaged out over the course of a soot loading cycle. Thus, signal trace LT might represent a normalized pattern of electromagnetic energy attenuation obtained where the associated engine is operated for a soot loading cycle at a relatively higher load and thus higher filter temperature conditions, signal trace HT corresponds to lower temperature engine operation, and signal trace MT corresponds to medium temperature operation. It will thus be appreciated that filter temperature, such as might be sensed via temperature sensor 50 may be a factor which is considered when interpreting a pattern of electromagnetic energy attenuation and determining what amount of ash the subject pattern is associated with. The sensed filter temperature might include an absolute temperature sensed at the end of a given sampling period, but might also include an average temperature deduced from multiple temperature inputs over the course of a particular sampling period. In any event, determining the value indicative of an amount of the ash may further include determining the value responsive to filter temperatures coincident in time with the pattern of electromagnetic energy attenuation which is of interest.

INDUSTRIAL APPLICABILITY

Figure 4:
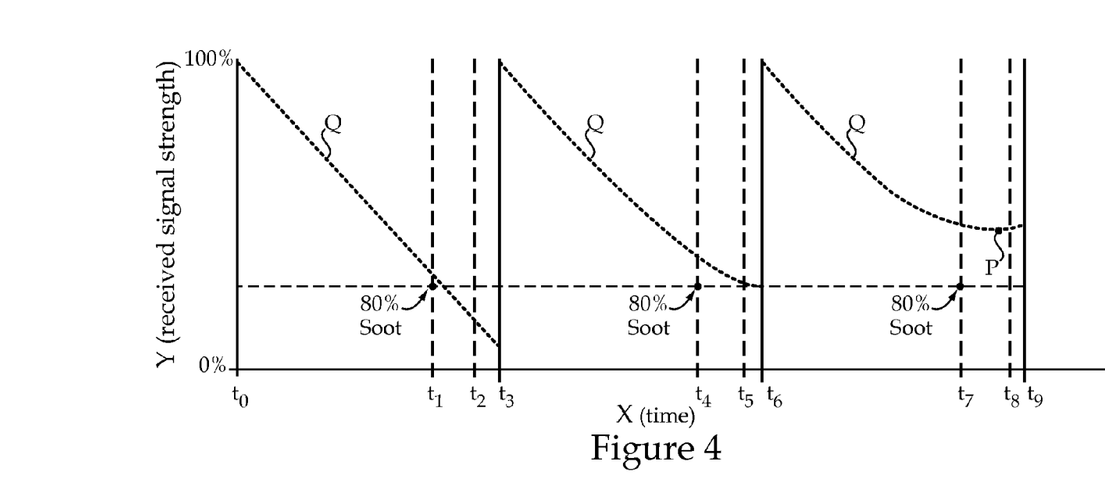
FIG. 4 is a graph illustrating sensed electromagnetic energy strength over time for three soot loading cycles of an exhaust particulate filter system.

Referring now to FIG. 4, there is shown a graph of received signal strength for electromagnetic energy in comparison to time. On the X-axis, a plurality of time intervals from $T_0$ to $T_9$ are shown. At time $T_0$, the beginning of a soot loading cycle where filter 24 has just been regenerated and is clean and substantially free of soot, the received signal strength corresponding to a sensed strength of transmitted electromagnetic energy may be at or relatively close to 100%. From time $T_0$ to time $T_3$, engine system 16 and hence exhaust particulate filter system 22 is being operated such that particulates generated via operation of engine 18 are passed through exhaust conduit 21, and eventually into filter 24 to be trapped therein within filter medium 31. Accordingly, a line Q in FIG. 4 shows a generally decreasing strength of electromagnetic energy as an amount of soot within filter 24 increases. At approximately time $T_3$, filter 24 may be regenerated such that the trapped soot is combusted. From time $T_3$ to time $T_6$, another soot loading cycle is represented, and yet another soot loading cycle follows from time $T_6$ to time $T_9$. The three soot loading cycles depicted in FIG. 4 may not necessarily be immediately succeeding, but are shown as such for illustrative purposes. In the first soot loading cycle from time $T_0$ to time $T_3$, a time interval from time $T_1$ to time $T_2$ is shown, beginning at about an 80% soot loading state of filter 24. The time interval from time $T_1$ to time $T_2$ represents an example time interval at which data may be analyzed to detect ash. While a stored filter monitoring history that includes the entirety of every soot loading cycle could certainly be used in ash detection, it will be noted that the characteristics of the stored filter monitoring history which are leveraged to detect ash may be more readily apparent at higher soot loads. Thus, beginning at about an 80% soot load, data evincing the patterns of electromagnetic energy attenuation of interest can be expected to be obtained. Depending upon the selected frequency of the electromagnetic energy, filter volume and other factors such as filter shape, inlet and outlet geometries, data may exhibit the patterns of interest at relatively lower soot loads, or possibly relatively higher soot loads. Furthermore, in some instances, relatively higher electromagnetic frequencies may exhibit the patterns of interest at relatively higher soot loads, and lower electromagnetic frequencies may exhibit such responses at relatively lower soot loads. It may be noted that in the time interval from $T_1$ to $T_2$ line Q includes a relatively steep slope. In the second soot loading cycle, it may be noted that line Q begins to flatten out in time interval $T_4$ to $T_5$. In the third soot loading cycle, line Q exhibits a saturation pattern, approaching a point of maximum attenuation and then beginning to reverse at an inflection point P. As described herein, the slope of line Q, such as the slope in time interval $T_4$ to $T_5$, and certainly time interval $T_7$ to $T_8$, as well as or in addition to detection of a saturation pattern and/or inflection point P may be used to detect ash.

Figure 5:
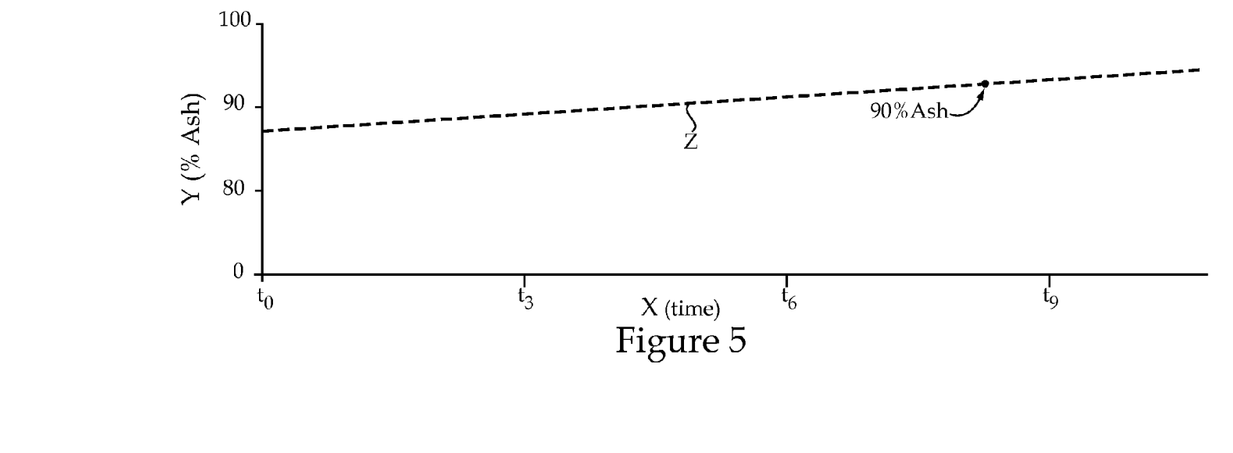
FIG. 5 is a graph of ash loading over time for an exhaust particulate filter system according to one embodiment.

Referring also to FIG. 5, there is shown relative ash loading state from time $T_0$ to time $T_9$. A line Z illustrates the relatively gradual increase in ash amount, and includes a point corresponding approximately to a 90% ash loading state of filter 24. As discussed above, microprocessor 46 may be configured to output a control signal to an operator perceptible alert mechanism such as check engine light 58, if an amount of ash detected is indicative of a change in relative ash loading state among a finite number of relative ash loading states of filter 24. This means that microprocessor 46 could communicate to an operator, or log in memory 48, the points in time at which filter 24 passes a first ash threshold, a second ash threshold, a third ash threshold, and so on. When a highest ash threshold is exceeded, such as 90%, then an operator may be notified by way of check engine light 58, for instance, that filter servicing is needed. The finite number of ash loading states might include ten ash loading states in one embodiment. Accordingly, the data depicted in FIGS. 4 and 5 may be understood to represent a state at which filter 24 has passed from an 80% ash loading state to a 90% or greater ash loading state. Implementation of the present disclosure in this general manner may be computationally less intensive than attempting to detect an absolute amount of ash, as given the relatively long service intervals for cleaning an exhaust particulate filter of ash, maximum precision in detecting ash amount may not be necessary. It should nevertheless be appreciated that since the amount of ash contained within an exhaust particulate filter can affect the rate at which a filter reaches a soot loading state at which regeneration is desired, such as about 6 grams soot per liter of available filter volume, detection of absolute ash amount or an estimate thereof might be used to vary regeneration timing to avoid unnecessarily early filter regenerations, and/or to avoid pushing filter regeneration past a point in time at which risk of damage to the exhaust particulate filter occurs. Thus, in certain embodiments the present disclosure contemplates timing a regeneration cycle, such as setting a time at which control commands are sent to injector 36, based upon the detected ash amount, or the determined value indicative thereof.

Figure 6:
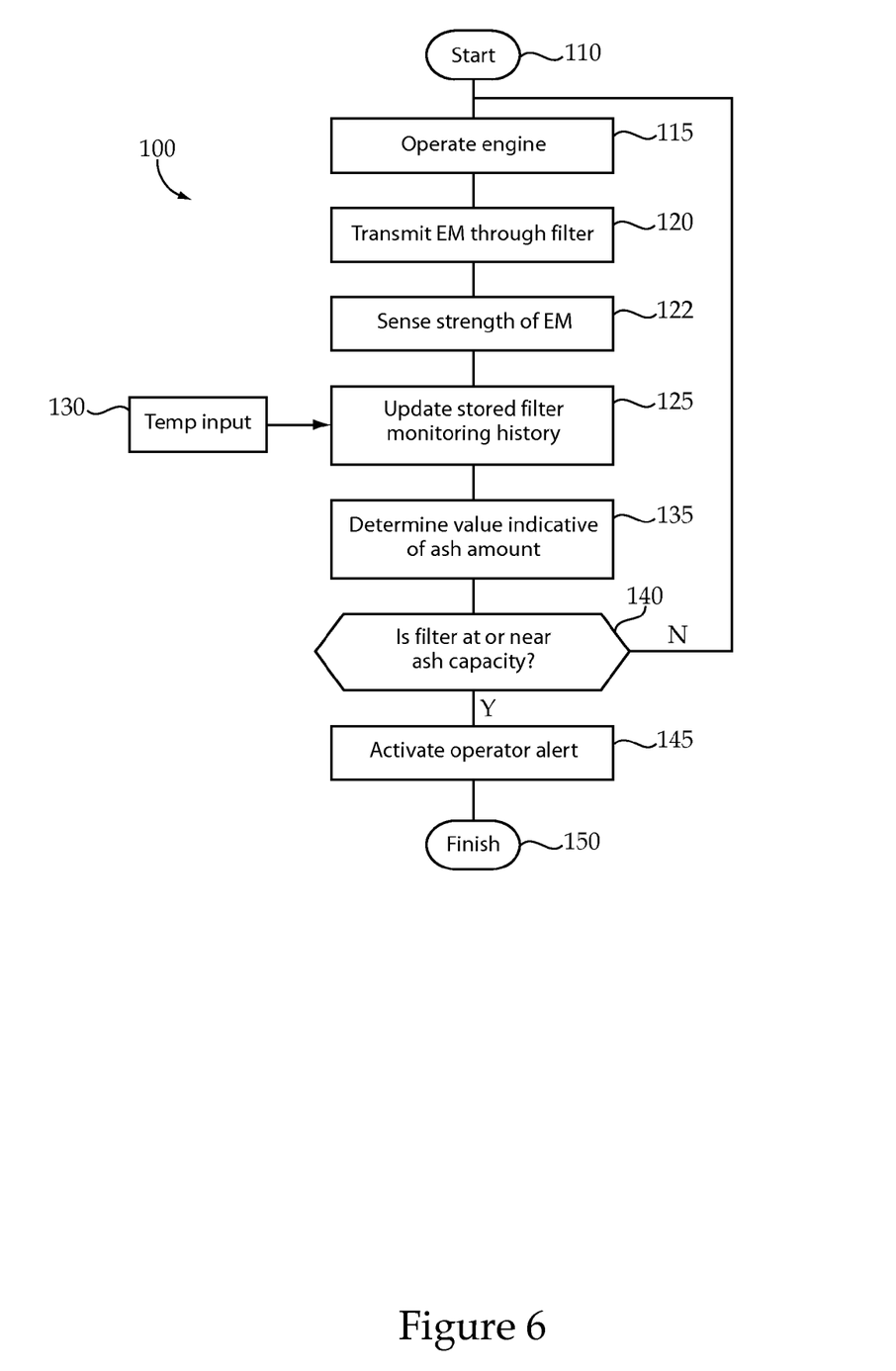
FIG. 6 is a flow chart illustrating ash detection methodology according to one embodiment.

Turning now to FIG. 6, there is shown a flowchart illustrating example control methodology according to the present disclosure. The process of flowchart 100 may start at step 110, and then proceed to step 115 at which engine 16 is operated. From step 115, the process may proceed to step 120 to transmit electromagnetic energy through filter 24. As described herein, transmitting electromagnetic energy may include transmitting a plurality of electromagnetic frequencies. From step 120, the process may proceed to step 122 at which a strength of the electromagnetic energy, including a strength of each of the electromagnetic frequencies, is sensed. From step 122, the process may proceed to step 125 to update a stored filter monitoring history as described herein. It will be recalled that the stored filter monitoring history may include a history of mean values based upon a difference between transmitted strength and sensed strength at each of the plurality of electromagnetic frequencies. Updating the stored filter monitoring history may further include storing a calculated mean value for a later time such that the filter monitoring history defines a pattern of electromagnetic energy attenuation based on the mean value for the later time and a previously stored mean value for an earlier time. At step 125, a temperature input 130 may be received. As mentioned above, the temperature input may include an absolute temperature value at the end of a time interval of interest, but might also include an average temperature value for the subject time interval. From step 125, the process may proceed to step 135 to determine the value indicative of ash amount as described herein. From step 135, the process may proceed to step 140 to query whether filter 24 is at or near its ash capacity. At step 140, for instance, microprocessor 46 might query whether filter 24 is above 90% of its design ash loading capacity. If no, the process may loop back to execute steps 115 to 140 again. If yes, the process may proceed to step 145 to activate an operator alert such as operator alert mechanism 58. In parallel with step 145, for instance, microprocessor 46 may output a signal encoding the determined ash amount, or a changed ash amount since a preceding time interval, for recording on computer readable memory 48. From step 145, the process may proceed to step 150 to finish.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims.

What is claimed is:

1. A method of detecting ash in an exhaust particulate filter system for an internal combustion engine comprising the steps of:
sensing a strength of electromagnetic energy transmitted through an exhaust particulate filter containing soot and ash;
updating an electronically stored filter monitoring history responsive to a difference between a transmitted strength of the electromagnetic energy and the sensed strength; and
determining via a microprocessor a value indicative of an amount of the ash responsive to a pattern of electromagnetic energy attenuation defined by the updated filter monitoring history, and the pattern varying from a greater attenuation relative to soot amount at an earlier time where the exhaust particulate filter is in a lower soot loading state, to a lesser attenuation relative to soot amount at a later time where the exhaust particulate filter is in a higher soot loading state.

2. The method of claim 1 wherein the step of determining further includes determining the value responsive to filter temperatures coincident in time with the pattern of electromagnetic energy attenuation.

3. The method of claim 2 wherein the step of determining further includes determining a value indicative of a relative amount of the ash.

4. The method of claim 3 further comprising a step of outputting a control signal to an operator perceptible alert mechanism, if the amount of ash is indicative of a change in relative ash loading state among a finite number of relative ash loading states of the exhaust particulate filter.

5. The method of claim 2 further comprising a step of electronically storing data in the filter monitoring history which is indicative of a difference between transmitted strength and sensed strength of electromagnetic energy at the earlier time, and wherein the step of updating includes electronically storing data in the filter monitoring history which is indicative of a difference between transmitted strength and sensed strength of electromagnetic energy at a the later time.

6. The method of claim 5 wherein the step of determining further includes determining the value responsive to detecting an inflection point in the pattern of electromagnetic energy attenuation.

7. The method of claim 5 wherein the step of determining further includes determining the value responsive to the slope of a line defined by the pattern of electromagnetic energy attenuation.

8. The method of claim 1 wherein the step of determining further includes determining the value responsive to a saturation pattern of electromagnetic energy attenuation defined by the stored filter monitoring history.

9. An exhaust particulate filter system for an internal combustion engine comprising:
   an exhaust particulate filter including a filter medium positioned fluidly between an exhaust inlet and an exhaust outlet in a filter housing, and being configured to trap soot and ash in exhaust from an internal combustion engine;
   a monitoring system including a transmitter for transmitting electromagnetic energy through the exhaust particulate filter, and a receiver for sensing a strength of the transmitted electromagnetic energy;
   the monitoring system further including a computer readable memory configured to store a filter monitoring history which includes data indicative of a difference between transmitted strength of the electromagnetic energy and sensed strength;
   the monitoring system further including a microprocessor coupled with the computer readable memory and being configured to determine a value indicative of an amount of ash contained within the exhaust particulate filter responsive to a pattern of electromagnetic energy attenuation defined by the stored filter monitoring history, and the pattern varying from a greater attenuation relative to soot amount at an earlier time where the exhaust particulate filter is in a lower soot loading state, to a lesser attenuation relative to soot amount at a later time where the exhaust particulate filter is in a higher soot loading state.

10. The system of claim 9 further comprising a temperature sensor configured to sense a temperature of the exhaust particulate filter, and wherein the microprocessor is further configured to determine the value responsive to sensed temperatures of the exhaust particulate filter.

11. The system of claim 9 wherein the microprocessor is further configured to determine the value responsive to the slope of a line defined by the attenuation at the earlier time and the attenuation at the later time.

12. The system of claim 9 wherein the microprocessor is further configured to determine the value responsive to detecting an inflection point in the pattern of electromagnetic energy attenuation.

13. The system of claim 9 wherein the microprocessor is further configured to determine the value responsive to detecting a saturation pattern of electromagnetic energy, and to responsively output a signal encoding an amount or a change in an amount of the ash.

14. A method of operating an exhaust particulate filter system comprising the steps of:
   transmitting electromagnetic energy through an exhaust particulate filter containing soot and ash;
   sensing a strength of the transmitted electromagnetic energy after having been attenuated in response to the soot;
   electronically storing data indicative of a difference between the transmitted strength and the sensed strength on a computer readable memory, such that a filter monitoring history stored on the computer readable memory defines a pattern of electromagnetic energy attenuation over time; and
   detecting an amount of the ash contained within the exhaust particulate filter via a microprocessor, responsive to the pattern; and
   electronically storing filter temperature data coincident in time with the pattern of electromagnetic energy attenuation;
   wherein:
   the step of transmitting further includes transmitting a plurality of electromagnetic frequencies;
   the step of sensing further includes sensing a strength of each of the plurality of electromagnetic frequencies; and
   the method further comprises a step of calculating a mean value based upon a difference between transmitted strength and sensed strength at each of the plurality of electromagnetic frequencies.

15. The method of claim 14 wherein the step of electronically storing includes electronically storing the calculated mean value for a later time such that the filter monitoring history defines the pattern of electromagnetic energy attenuation based on the mean value for the later time and a previously stored mean value for an earlier time.

* * * * *

UNITED STATES PATENT AND TRADEMARK OFFICE
CERTIFICATE OF CORRECTION

| | | |
|---|---|---|
| PATENT NO. | : 8,833,063 B2 | Page 1 of 1 |
| APPLICATION NO. | : 13/109550 | |
| DATED | : September 16, 2014 | |
| INVENTOR(S) | : Snopko et al. | |

It is certified that error appears in the above-identified patent and that said Letters Patent is hereby corrected as shown below:

In the Claims

Column 10, line 57, in Claim 5, after "at" delete "a".

Column 12, line 19, in Claim 14, after "over time;" delete "and".

Signed and Sealed this
Eighth Day of September, 2015

Michelle K. Lee
*Director of the United States Patent and Trademark Office*